United States Patent
Deguchi et al.

(10) Patent No.: US 10,254,731 B2
(45) Date of Patent: Apr. 9, 2019

(54) MACHINING PROGRAM CREATING DEVICE

(71) Applicant: FANUC CORPORATION, Yamanashi (JP)

(72) Inventors: Yuuji Deguchi, Yamanashi (JP);
Yorikazu Fukui, Yamanashi (JP);
Hideaki Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 82 days.

(21) Appl. No.: 15/461,338

(22) Filed: Mar. 16, 2017

(65) Prior Publication Data
US 2017/0277156 A1 Sep. 28, 2017

(30) Foreign Application Priority Data
Mar. 23, 2016 (JP) ................. 2016-058860

(51) Int. Cl.
*G05B 19/00* (2006.01)
*G05B 19/042* (2006.01)
*G05B 19/27* (2006.01)

(52) U.S. Cl.
CPC ......... *G05B 19/0426* (2013.01); *G05B 19/27* (2013.01); *G05B 2219/50049* (2013.01)

(58) Field of Classification Search
CPC ............... G05B 19/0426; G05B 19/27; G05B 2219/50049
See application file for complete search history.

(56) References Cited

U.S. PATENT DOCUMENTS 5,337,249 A * 8/1994 Fujita ................. G05B 19/4069
700/180
6,546,127 B1 * 4/2003 Seong ................ G05B 19/4069
318/599

(Continued)

FOREIGN PATENT DOCUMENTS

JP H9-123038 A 5/1997
JP 2014016982 A 1/2014

OTHER PUBLICATIONS

Office Action in JP Application No. 2016-058860, dated May 1, 2018, 4pp.

*Primary Examiner* — Christopher E. Everett
(74) *Attorney, Agent, or Firm* — Hauptman Ham, LLP

(57) ABSTRACT

A machining program creating device that calculates a movement command indicating a tool path based on the machining program including the machining cycle command includes machining region calculating means for calculating a machining region based on a machining condition and a finished shape specified by the machining cycle command, movement command calculating means for calculating the movement command based on the machining condition specified by the machining cycle command, and the machining region calculated by the machining region calculating means, and machining program creating means for creating a machining program without a machining cycle command, based on an unmachined workpiece shape and the finished shape specified by the machining cycle command, the machining region calculated by the machining region calculating means, and the movement command calculated by the movement command calculating means.

2 Claims, 6 Drawing Sheets

(56) References Cited

U.S. PATENT DOCUMENTS

| | | | | |
|---|---|---|---|---|
| 6,889,114 B2* | 5/2005 | Nakamura | ......... | G05B 19/4068 318/567 |
| 2009/0265030 A1* | 10/2009 | Huang | ............... | G05B 19/4068 700/182 |
| 2013/0096700 A1* | 4/2013 | Tezuka | ............... | G05B 19/4068 700/83 |
| 2013/0338809 A1 | 12/2013 | Kume | | |

* cited by examiner

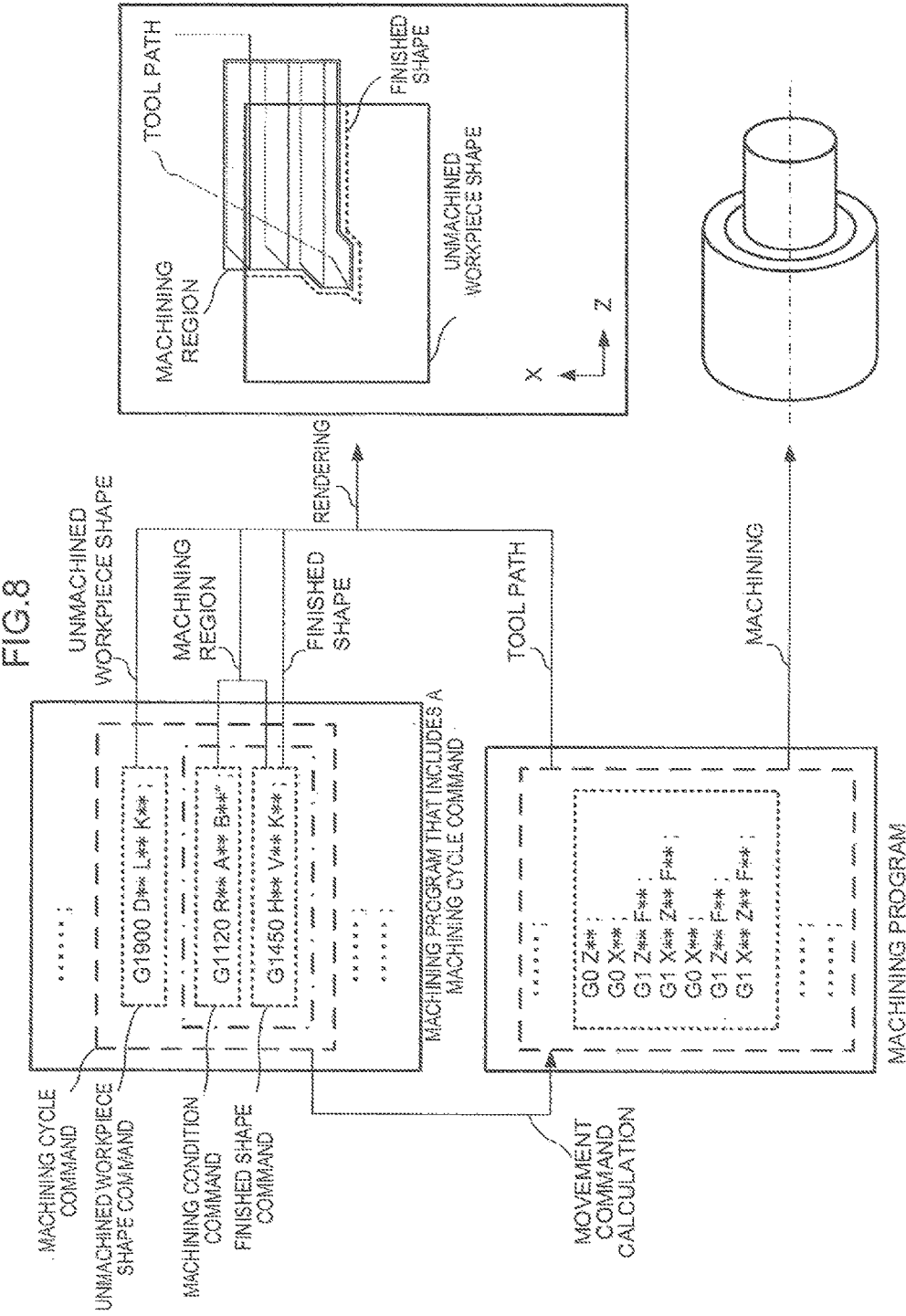

MACHINING PROGRAM CREATING DEVICE

RELATED APPLICATIONS

The present application claims priority to Japanese Application Number 2016-058860 filed Mar. 23, 2016, the disclosure of which is hereby incorporated by reference herein in its entirety.

BACKGROUND OF THE INVENTION

1. Field of the Invention

The present invention relates to a machining program creating device, and more particularly, relates to technology that makes it possible to reduce the time required to calculate a movement command from a machining program that includes a machining cycle command, and perform a simulation and rendering.

2. Description of the Related Art

One command used in a machining program for machining a workpiece is a machining cycle command that performs a series of movement commands of a plurality of blocks with just one command. The machining cycle command includes a command that defines an unmachined workpiece shape, a machining condition, and a finished shape.

When the machining cycle command is written in the machining program, a numerical controller that controls a machine tool generates a plurality of movement commands from the machining condition and finished shape defined in the machining cycle command, and controls a movable shaft based on his movement command to move a tool.

Also, Japanese Patent. Laid-Open No. 2014-016982 describes a structure in which a simulation portion of a numerical controller renders both a tool path calculated from a plurality of generated movement commands and an unmachined workplace shape defined by a machining cycle command.

A conventional numerical controller calculates a movement command based on a machining cycle command each time a workpiece is to be machined, using a machining program that includes a machining cycle command. Therefore, the machining took time (see FIG. 8).

On the other hand, in a conventional simulation such as that described in Japanese Patent Laid-Open No. 2014-016982, rendering is performed based on an unmachined workpiece shape and a finished shape that are defined in the machining cycle command, and a movement command calculated from a machining condition and the finished shape that are defined in the machining cycle command (see FIG. 8).

Therefore, if preprocessing such as calculating a movement command beforehand from the machining program that includes the machining cycle command were performed to reduce the machining time, information regarding the unmachined workpiece shape and the finished shape would end up being lost at the time of this preprocessing, so machining simulation would be unable to be performed, which is problematic. In other words, it was difficult to both reduce the time required to execute the machining program, and perform the machining simulation.

SUMMARY OF THE INVENTION

In order to solve such problems, it is an object of the present invention to provide a machining program creating device that is able to reduce the time required to calculate a movement command from a machining program that includes a machining cycle command, and perform a simulation and rendering.

A machining program creating device according to one aspect of the present invention is a machining program creating device that calculates a movement command indicating a tool path, based on a machining program that includes a machining cycle command, which includes machining region calculating means for calculating a machining region based on a machining condition and a finished shape specified by the machining cycle command, movement command calculating means for calculating the movement command based on the machining condition specified by the machining cycle command, and the machining region calculated by the machining region calculating means, and machining program creating means for creating a machining program without a machining cycle command, based on an unmachined workpiece shape and the finished shape specified by the machining cycle command, the machining region calculated by the machining region calculating means, and the movement command calculated by the movement command calculating means.

The machining program creating device according to another aspect of the present invention further includes machining program rendering means for rendering at least one of the unmachined workpiece shape, the finished shape, the machining region, and the tool path, based on the machining program without the machining cycle command created by the machining program creating means.

In the machining program creating device according to another aspect of the present invention, the machining program creating means stores the machining program without the machining cycle command in a predetermined storage region.

According to the present invention, it is possible to provide a machining program creating device that makes it possible to reduce the time required to calculate a movement command from a machining program that includes a machining cycle command, and perform a simulation and rendering.

BRIEF DESCRIPTION OF THE DRAWINGS

The foregoing and other objects and characteristics of the present invention will become apparent from the description of embodiments below with reference to the accompanying drawings. Of these drawings:

FIG. 8 is a view illustrating related art.

DETAILED DESCRIPTION OF THE PREFERRED EMBODIMENTS

A machining program creating device 100 according to one embodiment of the present invention creates a machining program without a machining cycle command, which includes a movement command, an unmachined workpiece shape command, a finished shape command, and a machining region command, from a machining program that includes a machining cycle command.

Figure 3:
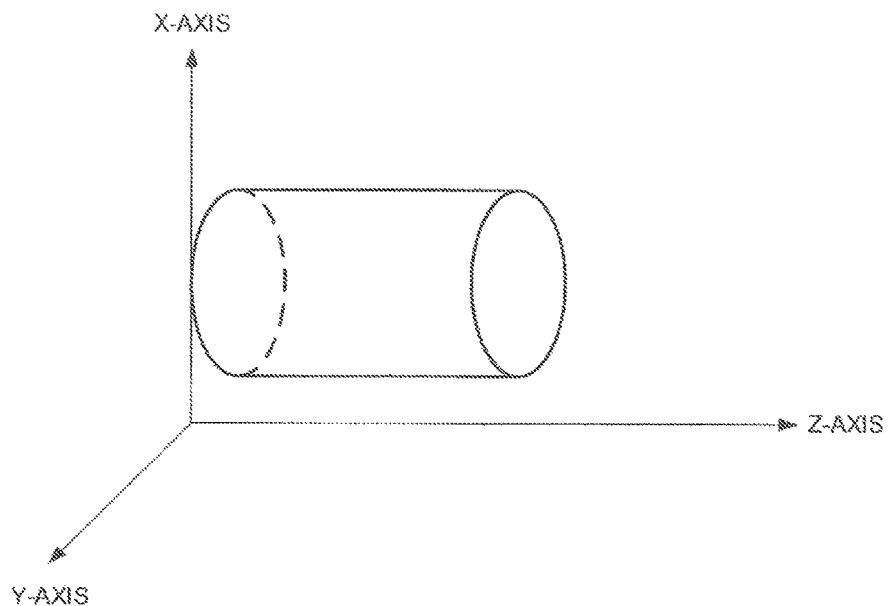
FIG. 3 is a view illustrating the content of an unmachined workpiece shape command included in a machining cycle command.

Here, the machining cycle command is a command in which a series of movement commands of a plurality of blocks are expressed by one command. The machining cycle command includes a command that defines each of an unmachined workpiece shape, a machining condition, and a finished shape. The unmachined workpiece shape command is a command that defines a dimension and position of material (FIG. 3). A machining condition command is a command that defines a cutting direction, a cutting feed rate, and a cutting amount and the like. The finished shape command is a command that defines the final shape (the finished shape) of the workpiece after machining.

Figure 1:
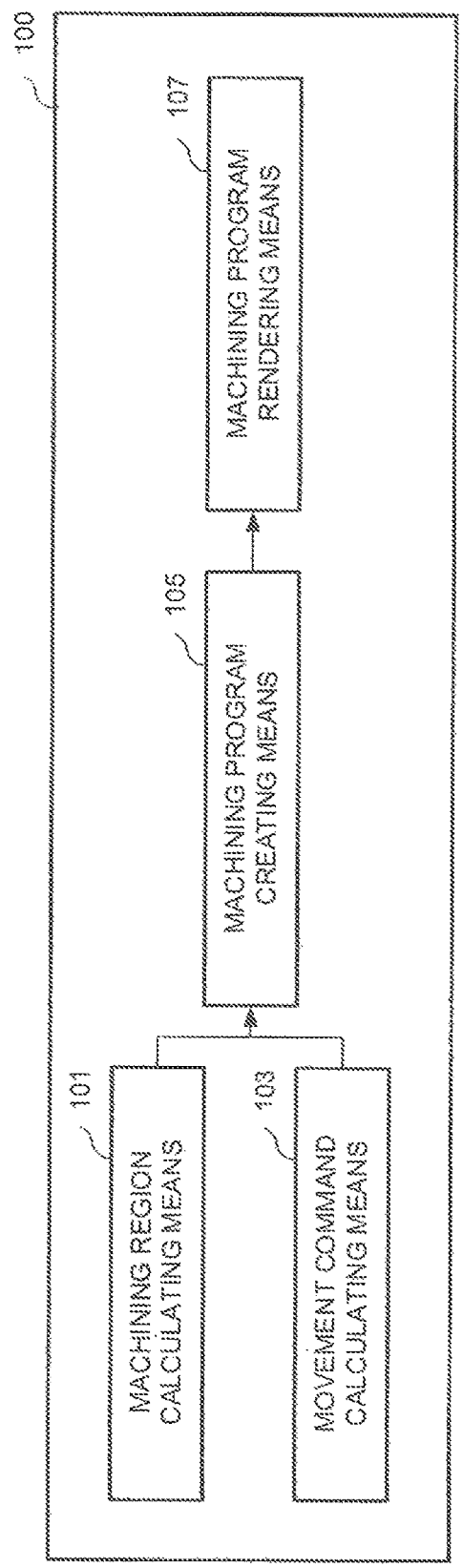
FIG. 1 is a block diagram of the structure of a machining program creating device according to an embodiment of the present invention.

The structure of the machining program creating device 100 will now be described with reference to the block diagram in FIG. 1.

The machining program creating device 100 includes machining region calculating means 101, movement command calculating means 103, machining program creating means 105, and machining program rendering means 107. Here, the machining program creating device 100 is an information-processing device that includes a central processing unit, a storage device, and input/output devices such as an input device and a display device, and logically realizes each of these means by the central processing unit executing a program stored in the storage device. Typically, the machining program creating device 100 is a numerical controller.

Figure 4:
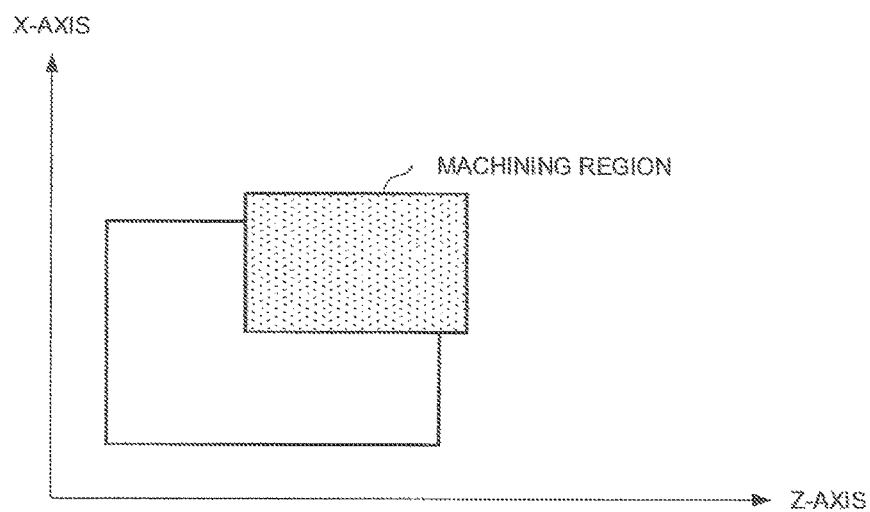
FIG. 4 is a view illustrating the content of a machining region command included in the machining cycle command.
Figure 5:
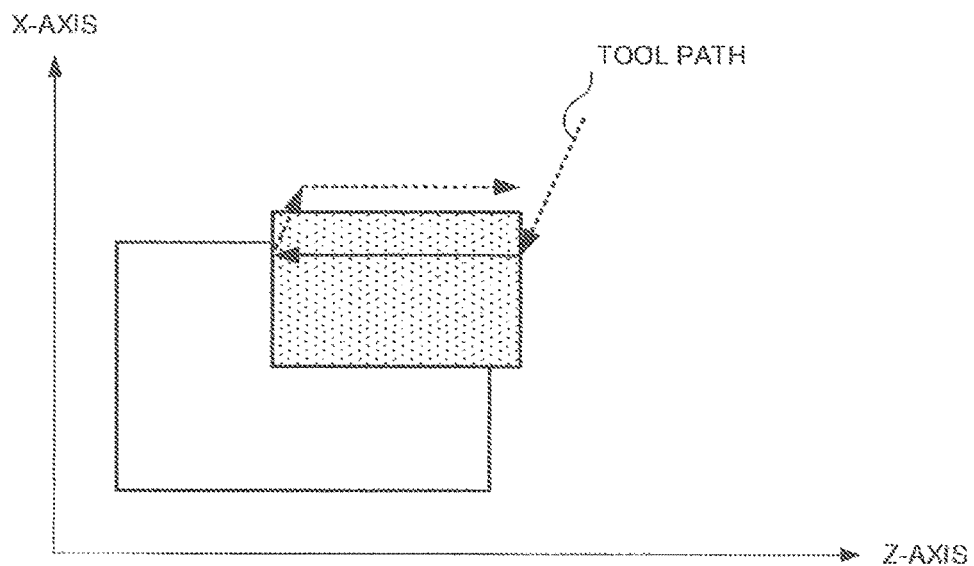
FIG. 5 is a view illustrating the content of a tool path command included in the machining cycle command.

The machining region calculating means 101 performs a process of calculating a machining region and generating a machining region command, based on a machining condition command and a finished shape command included in the machining cycle command. The machining region command is a command that defines a region where a tool moves for machining (FIGS. 4 and 5).

The movement command calculating means 103 performs a process of generating a movement command, based on the machining condition command included in the machining cycle command and the machining region command calculated by the machining region calculating means 101. The movement command is a command that, instructs a machine tool as to a travel path of a tool (a tool path), in which the tool path is expressed in the form of an ISO code program, for example.

The machining program creating means 105 creates a machining program without a machining cycle command, based on the unmachined workpiece shape command and the finished shape command included in the machining cycle command, the machining region command generated by the machining region calculating means 101, and the movement command generated by the movement command calculating means 103.

The machining program rendering means 107 performs a process of simulating at least one or more of the unmachined workpiece shape, the finished shape, the machining region, and the tool path, based on the machining program without the machining cycle command created by the machining program creating means 105, and renders the simulation results on the display device.

Figure 2:
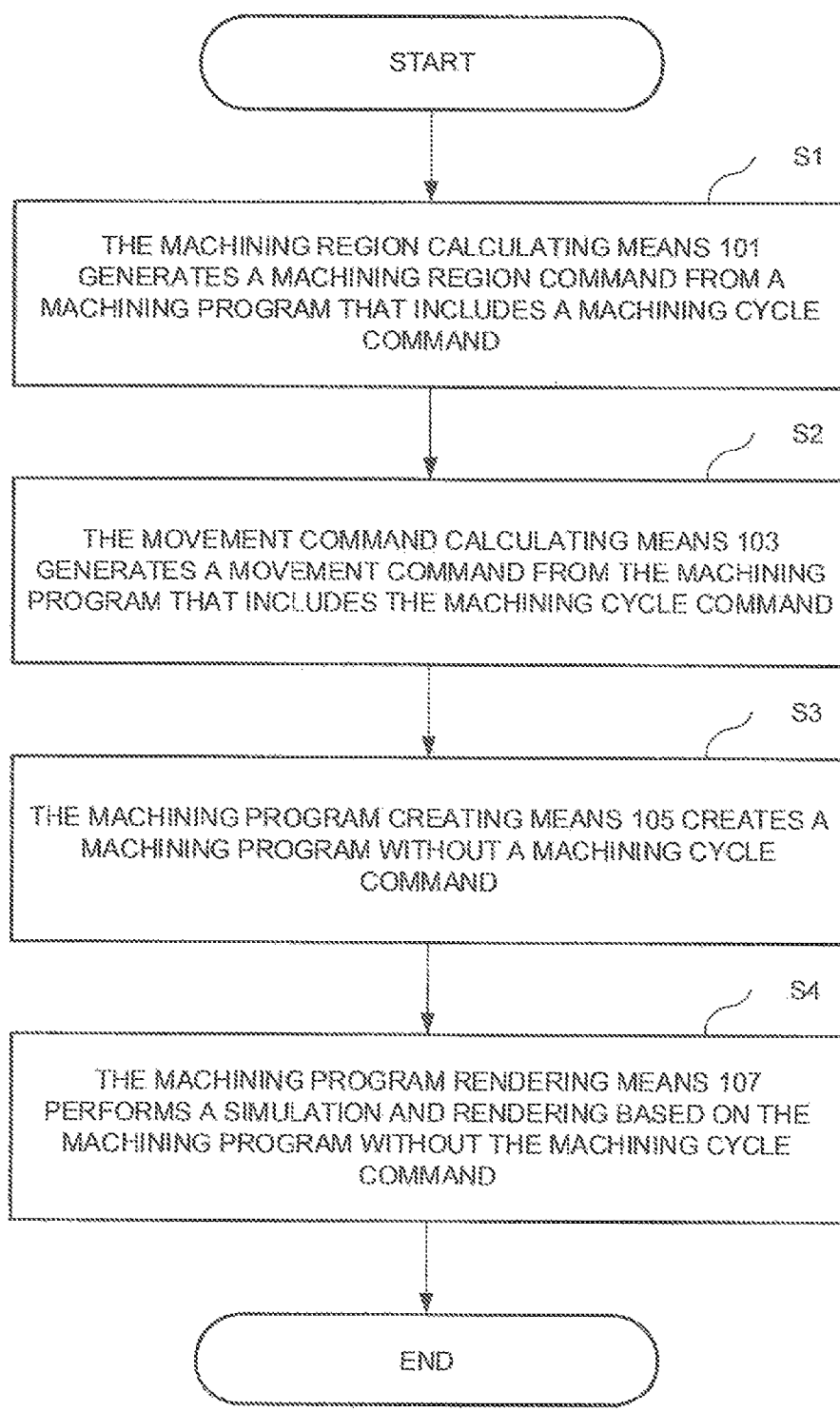
FIG. 2 is a flowchart of the operation of the machining program creating device according to the embodiment of the present invention.
Figure 6:
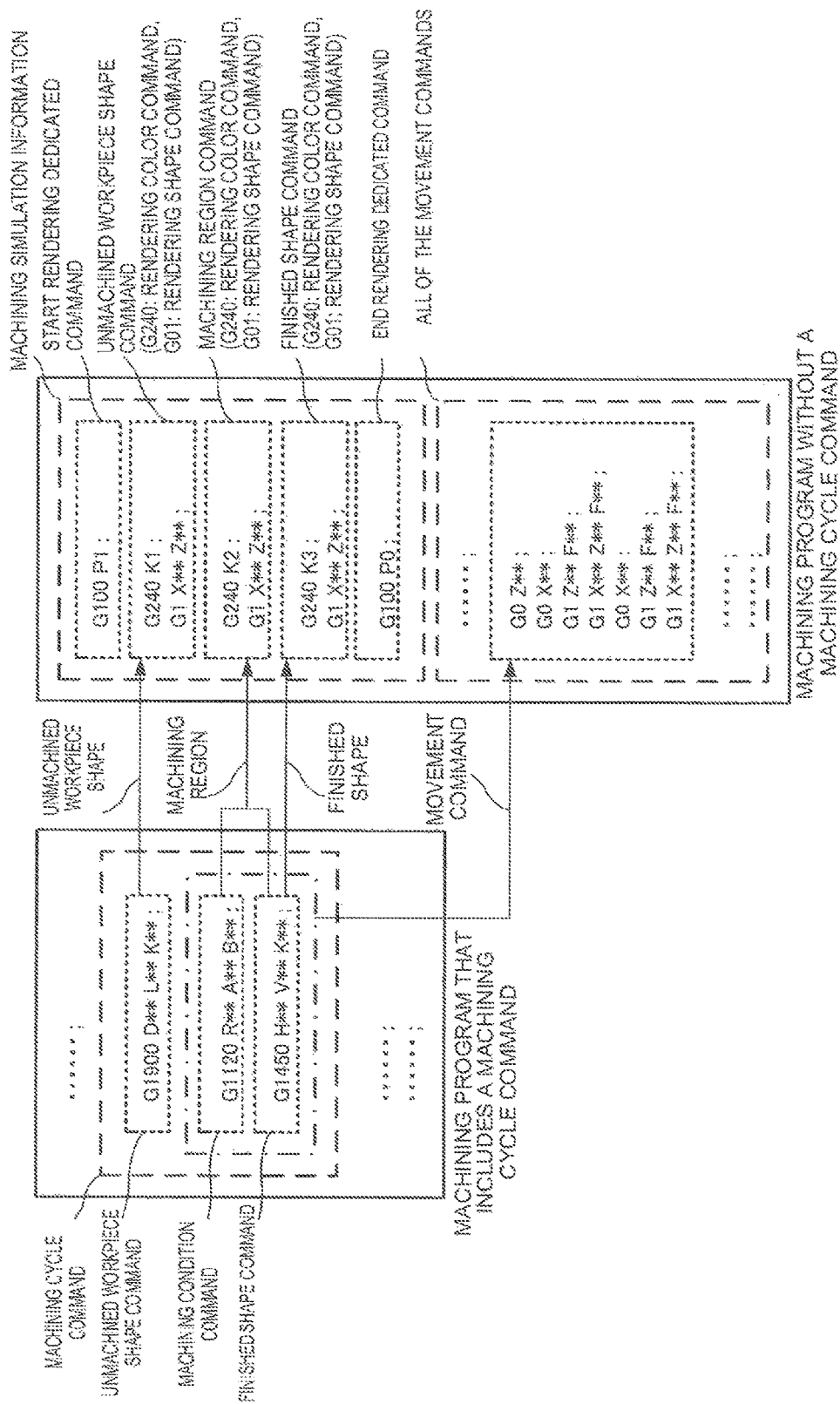
FIG. 6 is a view of one example of a machining program without a machining cycle command, which is created by machining program creating means.

Next, the operation of the machining program creating device 100 will be described with reference to the flowchart in FIG. 2, and FIG. 6.

S1: The machining region calculating means 101 deciphers a machining program that includes a machining cycle command, and extracts a machining condition command and a finished shape command. Also, the machining region calculating means 101 calculates a machining region and generates a machining region command, based on the machining condition command and the finished shape command. The machining program is typically input via the input device or is stored beforehand in the storage device.

S2: The movement command calculating means 103 deciphers the machining program that includes the machining cycle command and extracts the machining condition command. Also, the movement command calculating means 103 calculates a tool path based on the machining region command calculated by the machining region calculating means 101 and the machining condition command, and generates a movement command.

S3: The machining program creating means 105 creates a machining program without a machining cycle command. FIG. 6 is a view of one example of a machining program without a machining cycle command. The machining program without the machining cycle command includes two pieces of information, i.e., machining simulation information, and all of the movement commands.

Of these, the machining simulation information is information used by the machining program rendering means 107 in step S4 described later. The machining simulation information includes commands such as a command for starting a rendering dedicated command, an unmachined workpiece shape command, a finished shape command, a machining region command, and a command for ending a rendering dedicated command, that are extracted or calculated from the machining program that includes the machining cycle command.

All of the movement commands are information for defining the tool path. All of the movement commands include not only a movement command that was originally included in the machining program that includes the machining cycle command, but also a series of movement commands that have been converted from the machining cycle command.

The machining program creating means 105 stores the created machining program without the machining cycle command in the storage device, or outputs it to an arbitrary storage medium or output device or the like. Thereafter, when controlling the machine tool, or when performing a machining simulation, this machining program without the machining cycle command, which has been created in advance, will be used instead of the machining program that includes the machining cycle command. In this way, by expanding the machining cycle command into a plurality of movement commands in advance, the process of converting the machining cycle command to a plurality of movement commands, which was conventionally performed each time the machining program was executed, is able to be omitted, so the time required to execute the machining program is able to be reduced.

Figure 7:
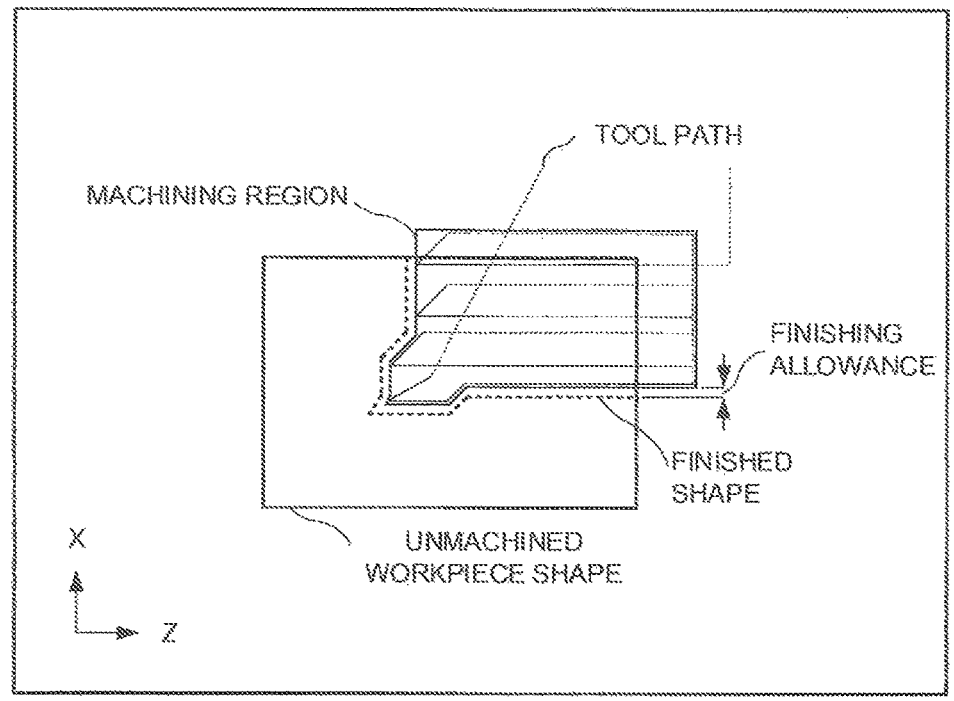
FIG. 7 is a view of one example of rendering results by machining program rendering means.

S4: The machining program rendering means 107 renders the unmachined workpiece shape, the finished shape, and the machining region on the display device, based on the machining simulation information included in the machining program without the machining cycle command created by the machining program creating means 105. Also, the machining program rendering means 107 renders the tool path indicated by the series of movement commands converted from the machining cycle command, from among all of the movement commands. The machining program rendering means 107 need only render at least one or more of the unmachined workpiece shape, the finished shape, the machining region, and the tool path. FIG. 7 is a view of one example of rendering results by the machining program rendering means 107. From this rendering, an operator can easily understand visually the machining content, i.e., the unmachined workpiece shape, the machining region, the finished shape, and the tool path, according to the machining program that includes the machining cycle command.

According to this embodiment, the machining region calculating means 101, the movement command calculating means 103, and the machining program creating means 105 create the machining program without the machining cycle command in advance based on the machining program that includes the machining cycle command. The machining program without the machining cycle command includes the plurality of movement commands of which the machining cycle command was expanded in advance, so the conversion process of the machining cycle command, which was conventionally necessary each time the machining program was executed, is able to be omitted, so the processing time can be reduced.

Also, according to this embodiment, the machining program without the machining cycle command includes information relating to the unmachined workpiece shape and the finished shape that were included in the machining cycle command, and information relating to the machining region calculated by the machining region calculating means 101. Therefore, the machining program rendering means 107 is able to execute the machining simulation using these pieces of information that would conventionally have been lost when the machining cycle command is converted into the plurality of movement commands. As a result, an operator is able to easily ascertain visually the machining content according to the machining program that includes the machining cycle command.

Also, the present invention is not limited to the various embodiments described above, and may be embodied with modifications such as substitutions, omissions, additions, and changes in the order of the constituent elements, without, departing from the spirit of the invention. For example, the simulation and rendering in step S4 may be omitted as necessary.

Further, it is assumed that the various means in the embodiment described above are realized by having a CPU (Central Processing Unit) execute a computer program via predetermined processing, but the various means may of course also be realized by hardware. Also, the computer program is able to be stored using various types of non-transitory computer readable medium, and supplied to a computer. Non-transitory computer readable medium includes various types of tangible storage medium. Examples of non-transitory computer readable medium include magnetic storage medium (e.g., a floppy disk, magnetic tape, a hard disk drive), magneto-optical medium (e.g., a magneto-optical disk), CD-ROM (Read Only Memory), CD-R, CD-R/W, and semiconductor memory (e.g., mask ROM, PROM (Programmable ROM), EPROM (Erasable PROM), flash ROM, RAM (random access memory)). Also, the program may be supplied to a computer by various types of transitory computer readable medium. Examples of transitory computer readable medium include electrical signals, optical signals, and electromagnetic waves. Transitory computer readable medium may supply a program to the computer via a wired communication path of electric wire or optic fiber or the like, or a wireless communication path.

Although embodiments of the present invention have been described above, the present invention is not limited to the foregoing embodiments, and may be carried out in other modes by making suitable modifications.

The invention claimed is:

1. A machining program creating device for calculating a movement command indicating a tool path, based on a machining program that includes a machining cycle command, the machining program creating device comprising:
   a machining region calculating unit configured to calculate a machining region based on a machining condition and a finished shape specified by the machining cycle command;
   a movement command calculating unit configured to calculate the movement command based on
      the machining condition specified by the machining cycle command, and
      the machining region calculated by the machining region calculating unit; and
   a machining program creating unit configured to create another machining program without the machining cycle command, the another machining program including:
      information regarding an unmachined workpiece shape and the finished shape specified by the machining cycle command,
      information regarding the machining region calculated by the machining region calculating unit, and
      the movement command calculated by the movement command calculating unit,
   wherein the machining program creating unit is configured to store the another machining program in a predetermined storage region.

2. The machining program creating device according to claim 1, further comprising:
   a machining program rendering unit configured to render at least one of the unmachined workpiece shape, the finished shape, the machining region, and the tool path, based on the another machining program created by the machining program creating unit.

* * * * *